June 11, 1963 W. J. FOWLER 3,092,902
SEAL INSTALLATION TOOL
Filed Oct. 15, 1959
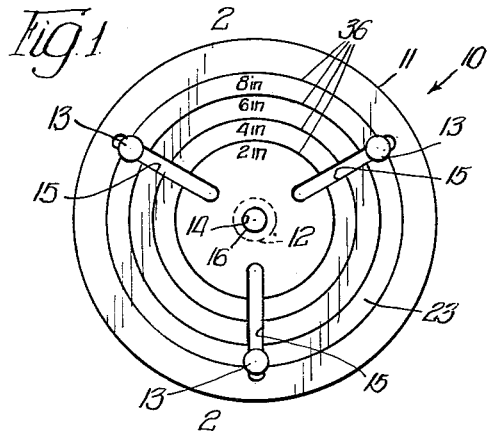
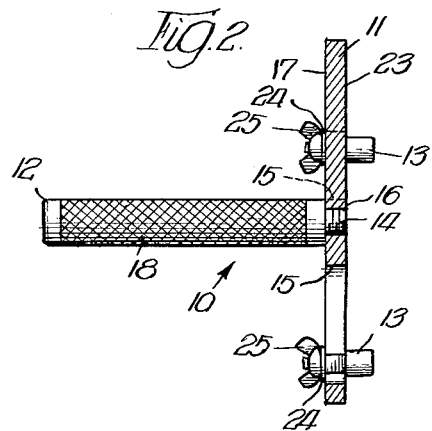
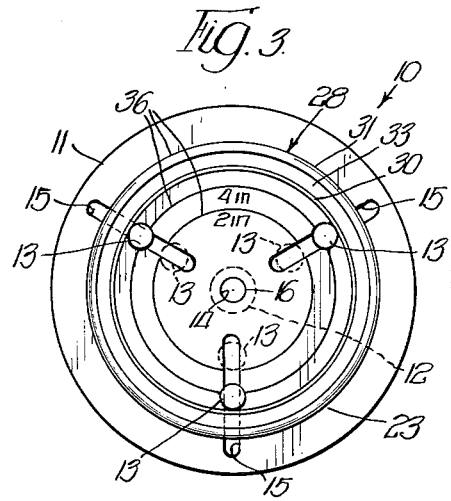
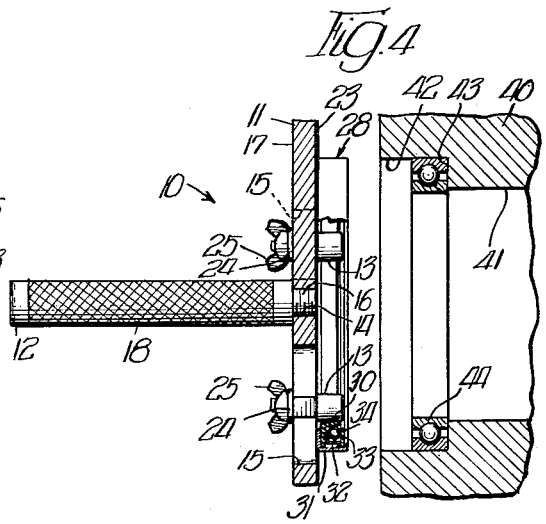
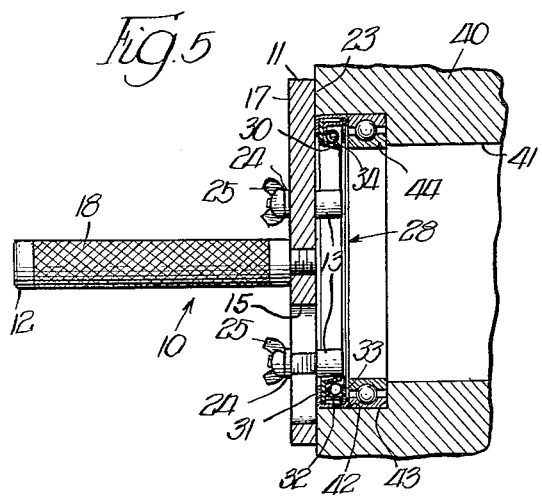
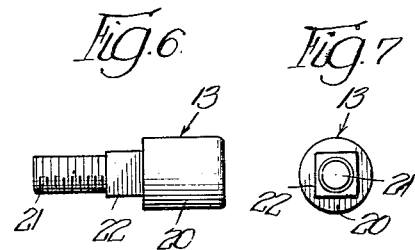
INVENTOR.
William J. Fowler,
BY
Cromwell, Greist & Warden
Attys.

3,092,902
SEAL INSTALLATION TOOL
William J. Fowler, Chicago, Ill., assignor to Chicago Rawhide Manufacturing Company, Chicago, Ill., a corporation of Illinois
Filed Oct. 15, 1959, Ser. No. 846,576
1 Claim. (Cl. 29—275)

The present invention is directed to a new and improved form of a shaft-sealing member installation tool designed particularly for manual use. More specifically, the present invention is directed to a new and improved seal installation tool incorporating therein adjustable features providing for ready and efficient installation of sealing members of various sizes in the bores of housings.

It is an object of the present invention to provide a new and improved seal installation tool of low-cost design and capable of ready and efficient use in the installation of sealing members of various sizes in the bores of housings.

A more detailed object of the invention is to provide a new and improved seal installation tool wherein an annular seal is adapted to be releasably held by a plurality of positionally adjustable jaw members onto a plate portion of the tool for insertion into the bore of a housing.

Another object of the invention is to provide a new and improved seal installation tool of the character described having seal insertion limiting means whereby to prevent damage to the seal during installation thereof.

Other objects not specifically set forth will become apparent from the following detailed description of the present invention made in conjunction with the drawings wherein:

FIG. 1 is an end elevation of the seal installation tool of the present invention;

FIG. 2 is a partial vertical section taken generally along the line 2—2 of FIG. 1;

FIG. 3 is an end elevation similar to FIG. 1 showing a seal supported on the tool and showing in broken lines the positions of the jaw members while the seal is being centered on the base plate of the tool;

FIG. 4 is a fragmentary longitudinal section of the tool with a seal supported thereon and illustrating the initial positioning thereof for operative use in the installation of the seal in the bore of a housing;

FIG. 5 is a view similar to FIG. 4 illustrating the final position of the tool upon completion of the installation of the seal;

FIG. 6 is an enlarged side elevation of one of the radially adjustable jaw members; and FIG. 7 is a left end elevation of the jaw member shown in FIG. 6.

Referring particularly to FIGS. 1 and 2, the seal installation tool 10 of the present invention includes a flat cylindrical base plate 11, a handle 12, and a series of radially adjustable jaw members 13. The base plate 11 is characterized by a centrally located internally threaded bore 14 and three elongated, radially extending slots 15 which extend through the plate 11 and are spaced equidistantly from one another.

The handle 12 which is in the form of an elongated rod-like member is provided at one end with a reduced-in-diameter externally threaded portion 16 which is adapted to be threadedly engaged in the bore 14 of the plate 11 so that the handle 12 projects normally from the center of one face 17 of the base plate 11. The outer surface of the handle 12 is knurled, as at 18, along a major portion of the length thereof whereby to facilitate manual gripping of the installation tool 10.

Each jaw member 13, as best illustrated in FIGS. 6 and 7, is characterized by a cylindrical seal-engaging end portion 20 having a diameter greater than the width of the slots 15, a reduced-in-diameter externally threaded opposite end portion 21, and an intermediate neck portion 22 which is square in cross-section whereby it is adapted to be non-rotatably but slidably confined in one of the elongated radially extending slots 15. Each of the jaw members 13 is adapted to be inserted through one of the slots 15 in a manner such that the seal-engaging end portion 20 thereof projects from a face 23 of the base plate 11 opposite the face 17 from which the handle 12 projects. A washer 24 is then fitted over each of the threaded end portions 21 of the jaw members 13 and against the face 17 of the base plate 11 after which a readily releasable wing nut 25 is threaded on the threaded end portion 21 of each jaw member 13. When the wing nuts 25 are in a released or loosened condition, the jaw members 13 may be readily adjusted radially of the base plate 11 between outermost positions defined by the outer ends of the slots 15 and innermost positions defined by the inner ends of the slots 15. After the jaw members 13 have been adjusted as desired, the wing nuts 25 may be tightened to retain the jaw members 13 in such adjusted positions.

An annular radially acting oil seal of any suitable construction, indicated generally by the reference numeral 28, is adapted to be held on the face 23 of the base plate 11 through engagement of the jaw members 13 with the inner diameter thereof whereby to facilitate installation of the oil seal 28 in a suitable bore in a housing. The seal 28 illustrated is a leather seal of the type shown in expired Patent No. 1,807,567 wherein a packing member 30 having axially and radially extending portions is suitably clamped in a cup-shaped cage 31 by a cup-shaped ring 32 and a washer member 33. A spring 34 is positioned about the axially extending portion of the packing member 30.

To mount the seal 28 on the face 23 of the base plate 11, the jaw members 13 are first loosened and slidably moved toward their innermost positions as indicated by the dotted line showings of the jaw members 13 in FIG. 3. The seal 28 is then centered on the face 23 of the base plate 11. To facilitate properly centering the seal 28, a series of concentric circular indicia 36, such as score lines, are provided on the face 23 of the base plate 11. For instance, in the installation tool 10 illustrated in the drawings, which is adapted for installing seals in truck wheels, the face 23 of the base plate 11 is provided with seal positioning indicia 36 for seals ranging in size from 2″ to 8″ in outer diameter. When the seal 28, which for illustration has been indicated as a 8″ seal, has been centered on the face 23 of the base plate 11 with its outer diameter in alignment with the proper one of the positioning indicia 36, the jaw members 13 are slidably moved outwardly in a radial direction in the grooves 15 into positioning engagement with the inner diameter of the seal 28. Upon tightening the wing nuts 25, the seal 28 is supported in a centered position on the installation tool 10. The jaw members 13 need engage the seal 28 only tight enough to position and support the seal 28 on the base plate 11. It is not necessary that the jaw members 13 tightly wedge the seal 28 onto the plate 11. The seal-engaging end portions 20 of the jaw members 13 are of such a size that they do not project beyond the outer surface of the seal 28 for a purpose which will be evident hereinafter.

FIGS. 4 and 5 illustrate installational use of the tool 10 in connection with a housing 40 including a shaft or axle receiving bore 41 which has an end portion 42 of increased diameter as defined by a radially extending annular shoulder 43 having mounted thereagainst a bearing 44. In FIG. 4, the seal 28 which is supported on the tool 10 is shown as aligned with the bore 42 for insertion therein. As seals of this type are usually press fitted into their associated bores, the end of the handle 12 is utilized as a striking or pressure surface to force the seal 28 into the bore 42 to ultimately position the seal 28 in abutment with the bearing 44 as illustrated in FIG. 5. The seal 28 will not be damaged by such blows inasmuch as the face 23 of the base plate 11 will be brought into engagement with the outer face of the housing 40 at the same time that the seal 28 is forced into engagement with the bearing 44. After the base plate 23 is in engagement with outer face of the housing 40, continued blows on the end of the handle 12 which would normally result in seal damaging shock are distributed by the plate 11 directly to the housing 40. It will also be appreciated that, under these circumstances, damage to the bearing 44 will be prevented by the alleviation of undue force applied thereto during the installation of the seal 28.

After the seal 28 has been properly installed in the bore 42, the tool 10 may be disengaged from the installed seal 28 by merely withdrawing it therefrom. The cylindrical configuration of the seal-gripping end portions 20 of the jaw members 13 and the smoothness of the finish thereof negates the necessity of loosening the wing nuts 25 and sliding the jaw members 13 inwardly prior to withdrawal of the tool 10 from the installed seal 28.

Obviously certain modifications and variations of the invention as hereinbefore set forth may be made without departing from the spirit and scope thereof, and therefore only such limitations should be imposed as are indicated in the appended claim.

I claim:

A tool for use in the installation of annular seals in the bores of housings, said tool comprising a flat cylindrical base plate, a handle projecting normally from the center of one face of said plate and having a striking surface at its outer end, a series of concentric circular indicia on the other face of said plate whereby to facilitate centered positioning of annular seals of various diameters on said other face of said plate, means defining three elongated radial slots extending through said plate, said slots being spaced equidistantly from one another, a radially adjustable elongated member slidable in each of said slots and having a co-linear jaw end portion projecting from said other face of said plate and a co-linear threaded opposite end portion projecting from said one face of said plate, the outermost surfaces of said jaw end portions of said radially adjustable members being alignable with said concentric circular indicia and adapted for abutting engagement with circumferentially spaced points on the inner diameter of an annular seal disposed flush against said other face of said plate in centered relationship thereon, and releasable nut means on said opposite end portions of said radially adjustable members for clamping same to said plate with said jaw end portions radially adjusted into engagement with a seal, whereby to releasably retain the seal on said other face of said base plate for axial insertion into the bore of a housing.

References Cited in the file of this patent

UNITED STATES PATENTS

| | | |
|---|---|---|
| 1,328,663 | Frisz | June 20, 1920 |
| 1,420,682 | Bright | June 27, 1922 |
| 2,389,954 | Burns | Nov. 27, 1945 |
| 2,465,366 | Frettoloso | Mar. 29, 1949 |
| 2,594,057 | Muehling | Apr. 22, 1952 |
| 2,775,025 | Williams | Dec. 25, 1956 |
| 2,860,535 | Fowler | Nov. 18, 1958 |
| 2,938,733 | Judelson | May 21, 1960 |